US005581487A

United States Patent [19]
Kelly et al.

[11] Patent Number: 5,581,487
[45] Date of Patent: Dec. 3, 1996

[54] METHOD AND APPARATUS FOR MICROSCOPIC SCREENING OF CYTOLOGICAL SAMPLES

[75] Inventors: Robert L. Kelly; Jason S. Holloway, both of San Diego; Donald L. Hakes, Encinitas, all of Calif.

[73] Assignee: Science Applications International Corporation, San Diego, Calif.

[21] Appl. No.: 200,643

[22] Filed: Feb. 23, 1994

[51] Int. Cl.$^6$ .................................... G01C 25/00
[52] U.S. Cl. ................ 564/571.01; 364/571.02; 364/571.04
[58] Field of Search .................... 356/247, 248; 348/141; 382/44, 47; 364/571.01, 571.02, 571.04, 571.07, 571.08

[56] References Cited

U.S. PATENT DOCUMENTS

| | | | |
|---|---|---|---|
| 3,617,629 | 11/1971 | McCarthy | 178/6.8 |
| 3,833,796 | 9/1974 | Fetner, et al. | 235/151.3 |
| 3,846,008 | 11/1974 | Sobajima et al. | 73/81 |
| 3,851,972 | 12/1974 | Smith et al. | 356/72 |
| 4,122,518 | 10/1978 | Castleman et al. | 364/300 |
| 4,404,683 | 9/1983 | Kobayashi et al. | 382/6 |
| 4,513,438 | 4/1985 | Graham et al. | 382/6 |
| 4,672,559 | 6/1987 | Jansson et al. | 364/525 |
| 4,700,298 | 10/1987 | Palcic et al. | 364/414 |
| 4,731,650 | 3/1988 | Hadfield et al. | 364/560 |
| 4,845,552 | 7/1989 | Jaggi et al. | 358/93 |
| 4,856,073 | 8/1989 | Farber et al. | 382/6 |
| 4,879,665 | 11/1989 | Akatsuka | 364/518 |
| 4,887,892 | 12/1989 | Bacus | 350/523 |
| 4,907,158 | 3/1990 | Kettler et al. | 364/413 |
| 4,998,284 | 3/1991 | Bacus et al. | 382/6 |
| 5,000,554 | 3/1991 | Gibbs | 350/529 |
| 5,016,283 | 5/1991 | Bacus et al. | 382/6 |

OTHER PUBLICATIONS

Kent Porter, Do–it–yourself, Jul. 1989, copy pp. 1–8, Dr Dobb's Journal of Software Tools, v 14, n 7, p. 119(7).

Charles Petzold, OS–2 Graphics Programming Interface:An Inroduction to Coordinate Spaces, Jul. 1988, 1–14 (copy provided), Microsoft Systems Journal v 3 n 4 p. 23(18).

Mastering Auto CAD, George Omura, Pub by Sybex, Inc. Alameda, CA, Pub 1987 ISBN 0–89588–378–3, pp. 291–297, 578–582, 587, and 588.

Forbes, et al., "Computer–Assisted Mapping with the Light Microscope", *Journal of Neuroscience Methods*, 1:77–94, (1979).

*Primary Examiner*—Emanuel T. Voeltz
*Assistant Examiner*—Craig Steven Miller
*Attorney, Agent, or Firm*—Fitch, Even, Tabin & Flannery

[57] ABSTRACT

In a microscopic screening apparatus a calibration slide is mounted on a stage of a microscope, and a microscope positioning system is calibrated by reading and storing in memory the location of at least one fiducial marking that is on the calibration slide using a microscope-dependent coordinate system. Next, a sample containing slide is mounted against the stage of the microscope. The location of at least one feature on the sample containing slide is then transformed into a microscope-independent coordinate system, and is stored in a memory. Using a second microscope, a second calibration slide is mounted against the stage of the second microscope, and the second microscope is calibrated using a second microscope-dependent coordinate system, based on the second microscope. Next, the sample containing slide is mounted against the second stage. The stored feature location is read from the memory, and transformed from the microscope-independent coordinate system to the second microscope-dependent coordinate system. The transformed feature location in the second microscope-dependent coordinate system is utilized to relocate the feature on the sample containing slide.

22 Claims, 7 Drawing Sheets

FIG. 2

METHOD AND APPARATUS FOR MICROSCOPIC SCREENING OF CYTOLOGICAL SAMPLES

BACKGROUND OF THE INVENTION

The present invention relates to the methods and apparatus for microscopic screening of cytological samples, and more particularly to an improved computerized method and apparatus for more reliably examining and screening Pap smears and other cytological samples for abnormal cells (atypia).

Typically, the screening of microscopic samples on a slide is accomplished by a cytotechnologist manually moving a microscope stage on which the slide is mounted so as to scan and view, through a microscope, each of the approximately sixty-thousand cells that are contained on the slide. In a typical laboratory environment the cytotechnologist is expected to review over ten such slides per hour. Thorough examination is required since a single abnormal cell (atypium) in the approximately sixty-thousand cells, may be present. Importantly, the single atypium may be sufficient to achieve early detection of, e.g., an incipient carcinoma or symptom of cervical cancer. Unfortunately, the false negative rate in commercial screenings, such as Pap smear screenings, is typically 10% or worse, even though a rate of 1% to 2% is medically achievable.

After the cytotechnologist has scanned the slide, each suspected positive, that is those slides containing possible atypia, and a portion of those slides that the cytotechnologists have determined contain no abnormal cells, are rescreened by a pathologist for a full diagnosis. To facilitate atypia relocation, the cytotechnologist physically marks the slides with a paint dot placed near the abnormal cell or cells. The pathologist can then restrict his or her rescreening to searching in the vicinity of the paint dots for the suspected abnormal cell or cells found by the cytotechnologist. Unfortunately, because of inexactness in the location of such paint dots and the size of the paint dots relative to the suspected abnormal cell or cells, considerable time is still required for the pathologist to relocate the suspected abnormal cells and to fully diagnose each rescreened slide.

Thus, in practice, much of the time spent by the pathologist, and by the cytotechnologist, is unfortunately spent performing non-diagnostic functions such as relocating suspected abnormal cells. Because such non-diagnostic functions distract from more important diagnostic functions, they contribute to the above-mentioned high false negative rate. Furthermore, the additional time that is spent screening each slide significantly increases the costs associated with routine medical screenings, such as Pap smears.

One prior apparatus and method which addresses the foregoing is described in U.S. Pat. No. 3,851,972 ('972 patent), issued Dec. 3, 1974. In the method of the '972 patent, individual cells are relocated through computer memorization of coordinate signals representative of a specific cell's location on the slide. Cell location is memorized as stage x and y coordinates, (as taken from step counters) referenced to the instrument's "Home" position, that is the position of the stage when the slide is loaded onto the stage. When the slide is reloaded onto the microscope stage, a mechanical assembly returns the slide to its original position based upon the memorized coordinates. Unfortunately, such operation requires highly repeatable and precise repositioning relative to the stage's home position, and relative to the instrument's optical axis. In practice these requirements result in excessively demanding tolerances on mechanical components and electrical drive circuitry, with correspondingly high hardware cost.

In other instruments unrelated to automated microscope systems, such as in numerical-controlled machine tools, and in some research automated microscope systems employed in scientific research, closed-loop positioning systems (positioning servos) incorporating linear encoders or similar sensors are used to provide precise positioning (sub-micron accuracy) of a controlled element. Such research automated microscope systems utilize a specialized precision stage in order to achieve such precise positioning. While the degree of precision permitted by such systems may satisfy the requirements for some microscopy applications, the hardware cost is much too high to permit their use in commercial automated microscope systems.

Another problem in screening microscopic samples is that the microscope used by the cytotechnologist may be a different microscope than that used by the pathologist to later relocate the possible atypia. This is common since a pathologist will usually work with and rescreen the slides of a number of cytotechnologists. Unfortunately, instruments and systems such as those described above, which record the location of atypia, or other features, using stage-dependent x and y coordinates relative to the home position of particular microscope stages, are not useful unless the pathologist is using a microscope that is identical to the microscope used by the cytotechnologist. This is because the location of the possible atypia are recorded relative to the home position on a particular stage of a particular microscope. Both the locations of the home position, and the measured location of the atypia relative to the home position, are highly dependent on the mechanical structure and precision of the microscope stage. Furthermore, the automated equipment or automated positioning system used to reposition the microscope to the exact location of the possible atypia must be extremely precise, and must perform identically in each of the microscopes unless positioning servos are utilized so as to compensate for differences in movement patterns of, e.g., the stages of the two microscopes. In either case, such equipment is very expensive.

Even such prohibitively expensive microscope systems do not offer a complete solution to the problems created by the use of different microscopes during screening and rescreening. As such microscopes are used, and thus, as the stage and positioning equipment wears, such systems become out of tolerance. As a result, accurate repositioning of a microscope, based on position information obtained from another microscope, becomes increasingly difficult, and eventually impossible.

Thus, a further problem with the system of the '972 patent arises because the '972 system uses coordinates that are measured relative to a particular stage. Specifically, both (i) the discrete motor steps along the x and y axes that are counted and used to identify locations on the slide and (ii) the angular relationship between the x and y axes, are dependent on the particular automated positioning equipment used to position the stage of the '972 system. In other words, the '972 system uses a microscope-dependent coordinate system to identify the location of the features on the slide. Thus, microscopes other than the microscope used to locate the features (or an identical microscope) are not able to accurately relocate the features. Therefore, the '972 system is not suitable for use in a multiple microscope environment.

The present invention advantageously addresses and overcomes the forgoing problems and shortcomings of prior microscope systems.

SUMMARY OF THE INVENTION

The present invention overcomes such problems and shortcomings by providing an improved and simplified automated microscope positioning system and method for relocating features within a sample. The system operates independently of the particular microscope on which the features are initially located, and/or relocated.

In operation, a microscope system is used to relocate at least one feature within the sample. The sample has been previously located, and the location has been stored in a memory device using a microscope-independent coordinate system.

To relocate the at least one feature using the microscope system, the sample is mounted against a stage, which moves within a microscope-dependent coordinate system and relative to a lens assembly of the microscope. The location of the at least one feature is recalled from the memory device, and transformed from the microscope-independent coordinate system into the microscope-dependent coordinate system. A field of view, which is defined by the lens assembly, is moved by moving the stage relative to the lens assembly so as to position the field of view on the location of the at least one feature on the sample. Thus, the at least one feature is relocated within the sample using the microscope.

In accordance with one embodiment of the invention, a first calibration slide is mounted on the stage of the first microscope. The calibration slide contains at least one fiducial marking that may consist of three fiducial points that are at non-collinear points on the first calibration slide, or may consist of any other marking or set of markings that are sufficient to define a two dimensional coordinate system (for example, two points and an angle, in the case of an oblique coordinate system).

Note that instead of the first calibration slide, many other calibration means are contemplated within the scope of this invention. For example, the fiducial marking may be imprinted directly onto the stage, or onto the sample. The calibration means need only contain fiducials that (1) define a coordinate system, and (2) can be fixed in a position relative to the stage during calibration of the stage which consists of storing the locations of the fiducial markings.

Through the first microscope, a portion of the slide is viewed. A first "field of view" is defined by the first microscope and is most commonly equated with that portion or area of the slide that is viewed. Alternatively, the first field of view may be some lesser area that is identified by a box or circle, by cross-hairs, or the like. The field of view may also be a point on the portion of the slide that is viewed.

After mounting the calibration slide on the stage, the first microscope positioning system is calibrated by reading and storing in a memory device the location of the at least one fiducial marking using a first microscope-dependent coordinate system. The microscope-dependent coordinate system may be an oblique or Cartesian coordinate system, having a "Home" position (or an origin), an x-axis (along which an abscissa is measured), and a y-axis (along which an ordinate is measured). Note that as used herein the term oblique coordinate system means any coordinate system using two straight line non-parallel axis, such axes may be orthogonal or non-orthogonal. The first microscope-dependent coordinate system need not, however, be orthogonal, i.e., the x-axis need not be normal to (rotated 90° relative to) the y-axis, but may not be parallel to the y-axis. Alternatively, the microscope-dependent coordinate system may be a polar coordinate system, an elliptical coordinate system, a parabolic coordinate system, a hyperbolic coordinate system, or the like.

Next, a sample is mounted against the stage of the first microscope. The sample, e.g., blood cells, that contains one or more features that are abnormal or atypical cells (or atypia). The sample may also be a crystalline material, such as a metal, and the features may be discontinuities or other flaws in the structure of the crystal. In any case, the field of view is moved to the location of one of the features, where the location is defined in the first microscope-dependent coordinate system. The location of the at least one feature (defined in the microscope-dependent coordinate system) is then transformed into a microscope-independent coordinate system. Such transformation is achieved using the previously stored location of the at least one fiducial marking on the calibration slide as the basis for a new, fiducial-based coordinate system independent of the microscope in which the sample is mounted. Preferably, the transformation is from the above-mentioned oblique coordinate system, to another oblique or Cartesian coordinate system that is independent of the microscope.

The location of the feature is stored in the memory device using the microscope-independent coordinate system, and the sample is removed from the microscope stage.

Preferably using a second microscope, a second calibration slide is mounted against the stage of the second microscope. The second calibration slide may be the same as or substantially identical to the calibration slide used in the calibration of the first mentioned microscope (tolerance being dependent on the particular application of the present invention—based on the size of the features to be relocated, how difficult the features are to manually relocate once the field of view is moved to a location near the features, and generally, the precision desired for the particular application). The second calibration slide contains the at least one fiducial marking located in substantially the same location as the at least one fiducial marking on the first mentioned calibration slide.

A portion of the second calibration slide is viewed, and a second field of view is defined by the second microscope. The second field of view may be of any of the above-mentioned types. Then, using the calibration method, the second microscope is calibrated using the at least one fiducial marking and a second microscope-dependent coordinate system, based on the second microscope.

Next, the sample containing the features to be relocated is mounted against the stage of the second microscope. The stored feature location is then read from the memory device, and transformed from the microscope-independent coordinate system to the second microscope-dependent coordinate system.

Finally, the feature locating information in the second microscope-dependent coordinate system is utilized to move the second field of view to the feature to be relocated in the sample. As a result, the feature is relocated within the sample independent of the particular microscope used to locate or relocate the feature.

The invention also may be characterized as an apparatus for carrying out the above-described method. The at least one feature within the sample is previously located, and the location is stored in the memory device using the microscope-independent coordinate system.

The apparatus has (1) means for mounting the sample against the stage of the microscope. A field of view is defined by the lens assembly of the microscope. The apparatus also includes (2) means for recalling from the memory device the location of the at least one feature, and (3) means for transforming the location of the at least one feature from the microscope-independent coordinate system into the microscope-dependent coordinate system. Finally, the apparatus has (4) means for moving the field of view by moving the stage relative to the lens assembly so as to position the field of view on the location of the at least one feature in the sample. Thus, an apparatus is provided for relocating the at least one feature within the sample.

In another embodiment, the invention may be characterized as a microscope system including: (1) a first microscope having a first stage; (2) a first calibration slide containing at least one fiducial marking; (3) means for mounting the first calibration slide against the first stage; (4) means for viewing a portion of the first calibration slide with the first microscope and defining a first field of view; (5) means for calibrating the first microscope by recording the location of the at least one fiducial marking using a first microscope-dependent coordinate system; (6) means for mounting a sample containing slide against the first stage, wherein the sample contains at least one feature; (7) means for moving the first field of view to the location of the at least one feature, wherein the location of the at least one feature is defined in the first microscope-dependent coordinate system; (8) means for transforming the location of the at least one feature to a microscope-independent coordinate system, wherein the means for transforming is responsive to the means for calibrating; (9) means for storing the location of the at least one feature using the microscope-independent coordinate system; (10) a second microscope having a second stage; (11) a second calibration slide that is the same as or substantially identical to the first calibration slide, and having at least one fiducial marking that is in a substantially similar location on the second calibration slide as the at least one fiducial marking on the first calibration slide; (12) means for mounting the second calibration slide against the second stage of the second microscope; (13) means for viewing a portion of the second calibration slide wherein a second field of view is defined by the second microscope; (14) means for calibrating the second microscope by recording the location of the at least one fiducial marking using a second microscope-dependent coordinate system; (15) means for mounting the sample against the second stage; (16) means for reading from storage the location of the at least one feature in the microscope independent coordinate system and for transforming the at least one feature location to the second microscope-dependent coordinate system; and (17) means responsive to the location of the at least one feature in the second microscope-dependent coordinate system for moving the second field of view to the location of the at least one feature on the sample.

BRIEF DESCRIPTION OF THE DRAWINGS

The above and other aspects, features and advantages of the present invention will be more apparent from the following more particular description thereof, presented in conjunction with the following drawings wherein:

FIG. 2 is a top view of a calibration slide made in accordance with the invention and suitable for use in conjunction with the microscopic screening apparatus of FIG. 1;

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
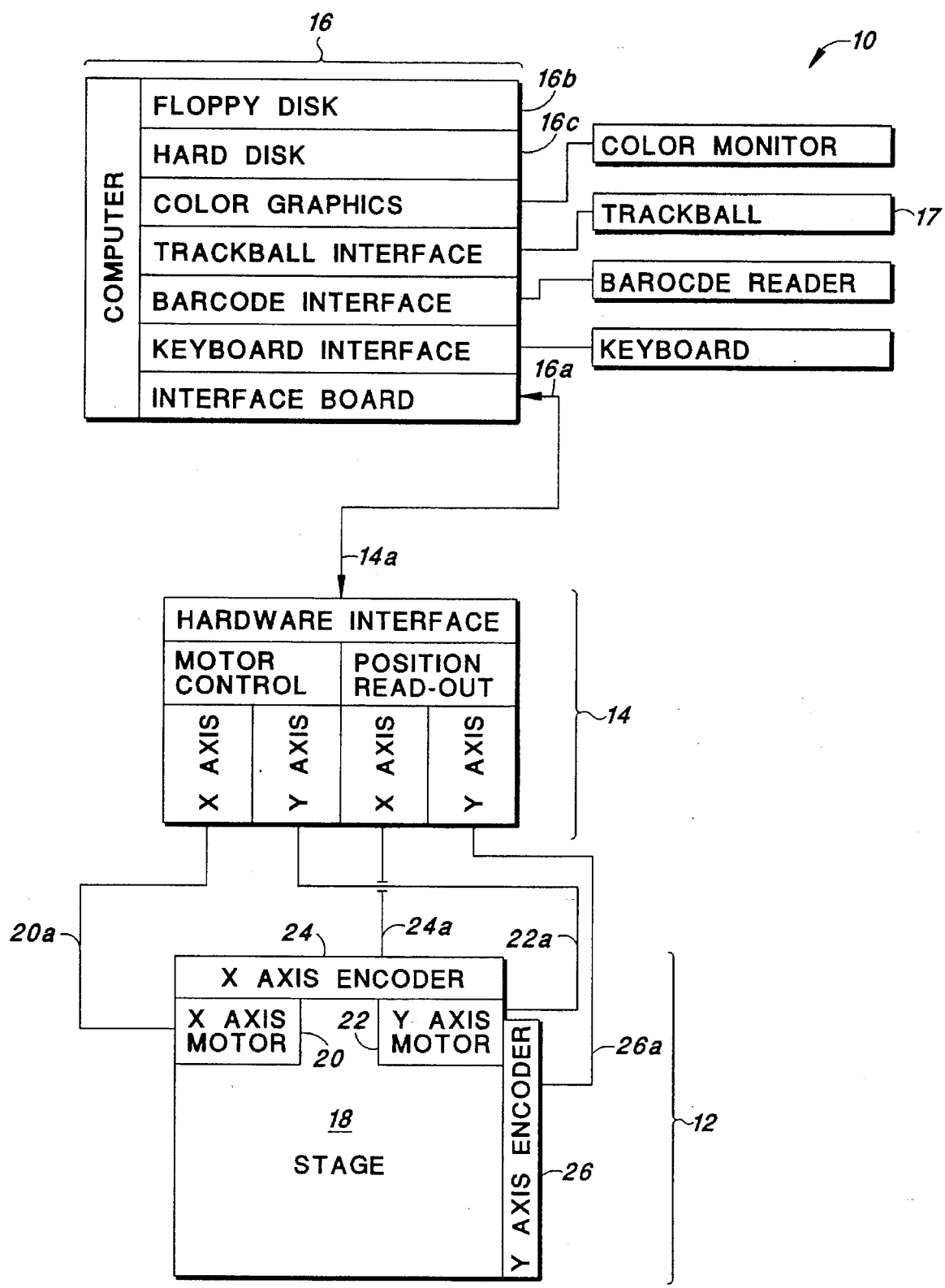
FIG. 1 is block diagram of a microscopic screening apparatus made in accordance with the present invention.

Referring first to FIG. 1, a block diagram is shown of a microscopic screening apparatus 10 made in accordance with the present invention. The screening apparatus includes (1) a microscope 12; (2) an interface unit 14; and (3) a processor 16.

The microscope 12 includes a stage 18 that is preferably coupled to an x-axis stepper motor 20, and a y-axis stepper motor 22. The stepper motors 20, 22 are used to position the stage along substantially linear x and y axes, respectively, which need not be orthogonal (rotated 90° relative to one another), but must not be parallel. A suitable stepper motor and driver system is available as model CT 32-39 from Compumotor of California. The stepper motors 20, 22 position the stage in response to the x and y positioning signals 20a and 22a, respectively, that are received from the interface unit 14.

Also coupled to the stage 18 are an x-axis encoder 24 and a y-axis encoder 26. The encoders 24, 26 are preferably linear encoders such as model number MSA 001 available from RSF Elektronik of Germany. In operation, the linear encoders 24, 26 produce one electrical pulse for each unit, e.g., micron of travel by the stage along the x or y axes. Note that the encoders described herein are accurate to within two to three microns, which is adequate for viewing animal or plant cells. As the stage moves in one direction along the x axis, for example, an x-axis counter included within the encoder 24 counts (or accumulates) the electrical pulses generated by the x-axis encoder 24. When the stage moves in the other direction along the x axis, the counter reduces the number of electrical pulses accumulated in the counter. As a result, the counter provides an accurate indication as to the precise position of the stage along the x-axis relative to an origin. In the event the stage reverses its direction, the electrical pulses are assigned a negative sign, and are therefore subtracted from the number of electrical pulses counted by the x-axis counter. The y-axis encoder 26 operates similarly along the y-axis of the stage using a y-axis counter included within the y-axis encoder. Thus, by reading the number of counted electrical pulses from x and y-axis counters, the microscopic screening system is able to precisely determine the location of the stage 18 (relative to an origin at some position along the x and y axes). The x and y-axis counters included in the x and y axis encoders, generate x and y-axis position signals 24a and 26a, respectively, that are coupled to the interface unit 14.

The interface unit 14 is coupled to the processor 16, and is preferably a model PC-23 motion controller available from Compumotor of California. The interface unit 14 receives a control signal 14a from the processor 16 that is used to generate the x and y-axis positioning signals 20a and 22a that control the stepper motors 20, 22. The processor receives a location signal 16a from the interface unit 14 that is generated in response to the x and y-axis position signals generated by the linear encoders 24, 26. Therefore, the location signal, which is preferably a digital signal, is indicative of the location of the stage 18.

In response to the location signal 16a, the processor 16 determines the location of the stage 18 after it has been positioned by a first operator, for example a cytotechnologist or other person responsible for locating features in the sample. (The term cytotechnologist is used herein as an example of one possible first operator, however it is to be understood that the first operator need not be a cytotechnologist. For example, a pathologist can serve as the first operator.) In addition, the processor 16 can position the stage 18 using a positioning servo in conjunction with the control signal 16a as an output signal and the location signal 14a as a feedback signal. The positioning servo may be implemented in a software servo routine such as the software servo routines commonly coded into interface units such as the PC-23 interface unit, or included in documentation that accompanies such interface units. See, e.g., "PC-23 Indexer Users' Guide."

Note however, that some adjustment must be made to the software servo routines in order to use the linear encoders 24, 26 in conjunction with the stepper motors 20, 22 described above. This is because the linear encoders 24, 26 are more accurate than the stepper motors. That is, the encoders have more "steps" (or possible distinguishable positions) than the stepper motors 20, 22. As a result, the processor 16 can direct the interface unit 14 to position the stage 18 at a prescribed encoder position, to which the stepper motors 20, 22 are incapable of moving the stage 18. Unless appropriate modifications are made to the software servo routines provided in the PC-23 or other interface unit documentation, the stage may "jitter" between two stepper motor positions that bracket the desired encoder position. That is, the encoder 24 and/or 26 will oscillate between indicating that the stepper motor 20, 22 has moved past the desired location and indicating that the stepper motor has not yet reached its desired location. In order to modify the servo routines, a tolerance must be built into the x and y-axis position signals 24a and 26a. For example, if "110" is the desired x-axis position signal (indicating x-axis encoder position 110), the servo is implemented so as to indicate that stepper motor 20, 22 has reached the location of the feature whenever the encoder is within ±3 of 110. Such adjustments to the software servo routine can easily be made by one skilled in the art and are dependent on the exact hardware used to implement the present invention.

The processor 16 performs the above-described functions in response to a control program, which is preferably a control program made in accordance with the flow diagrams described below.

Figure 2:
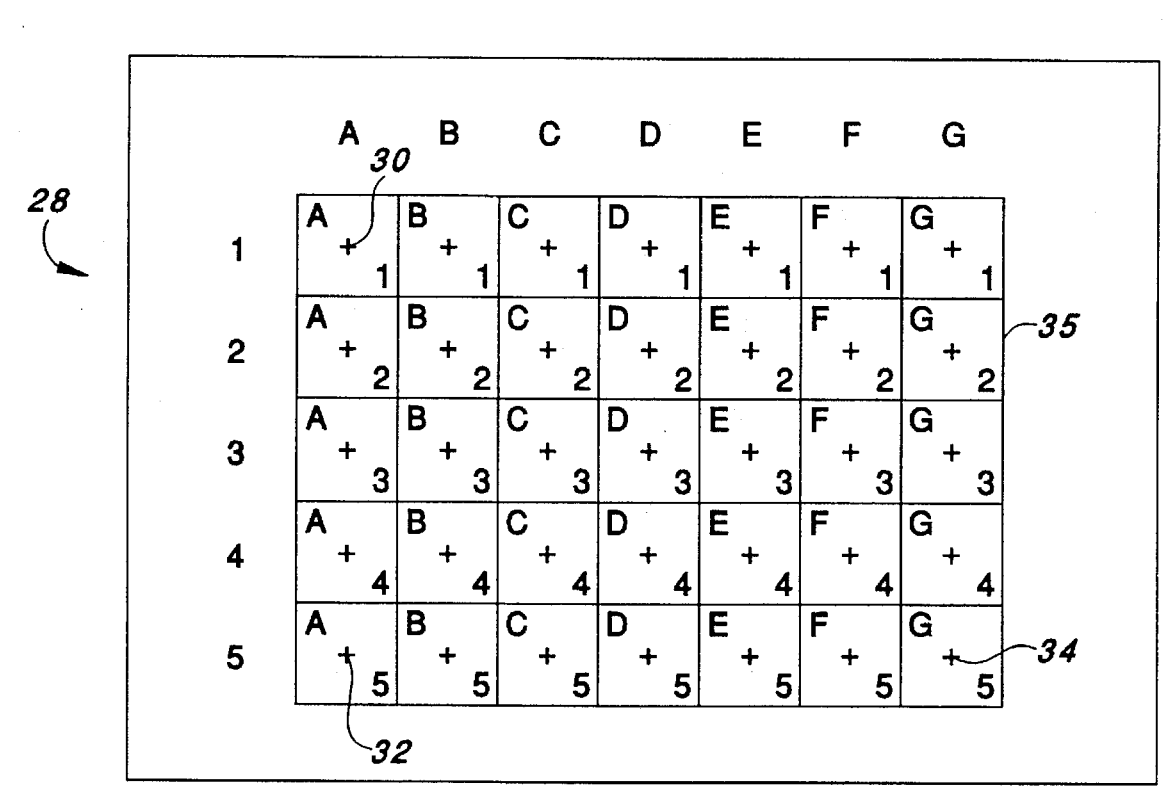

Referring next to FIG. 2, a top view is shown of a calibration slide 28 made in accordance with a preferred embodiment of the present invention. The calibration slide 28 contains a first fiducial 30, a second fiducial 32 and a third fiducial 34, which are at non-collinear points on the calibration slide 28.

Figure 3B:
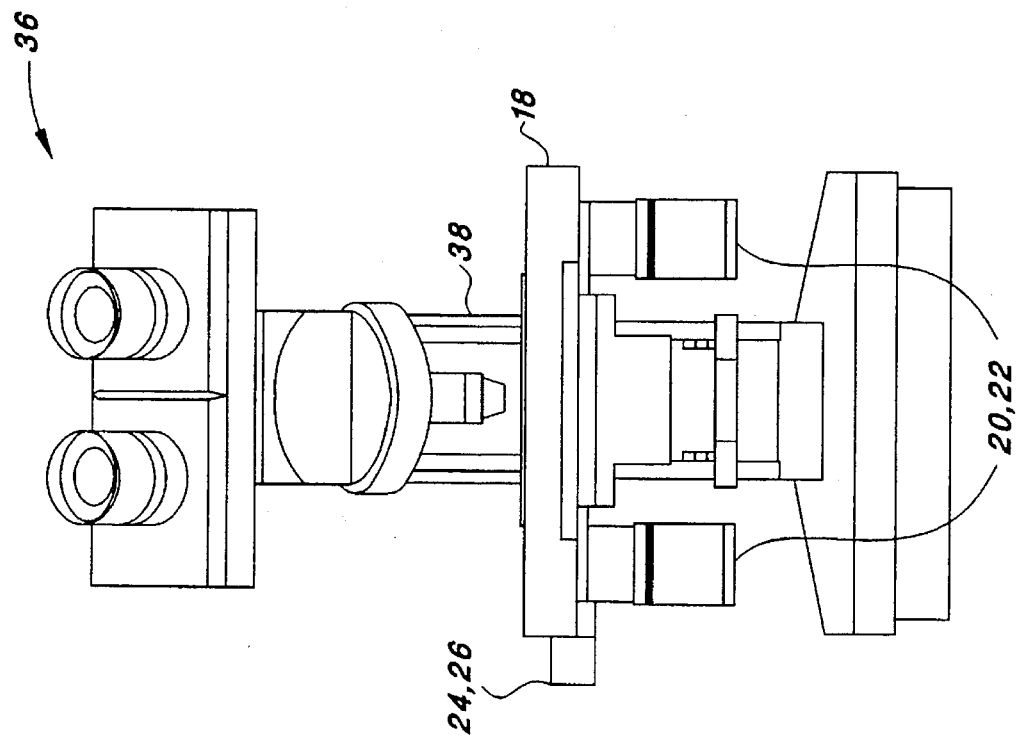
FIGS. 3A and 3B are side and front views respectively of a microscope than includes first and second stepper motors and first and second linear encoders for use in the microscopic screening apparatus of FIG. 1.
Figure 3A:
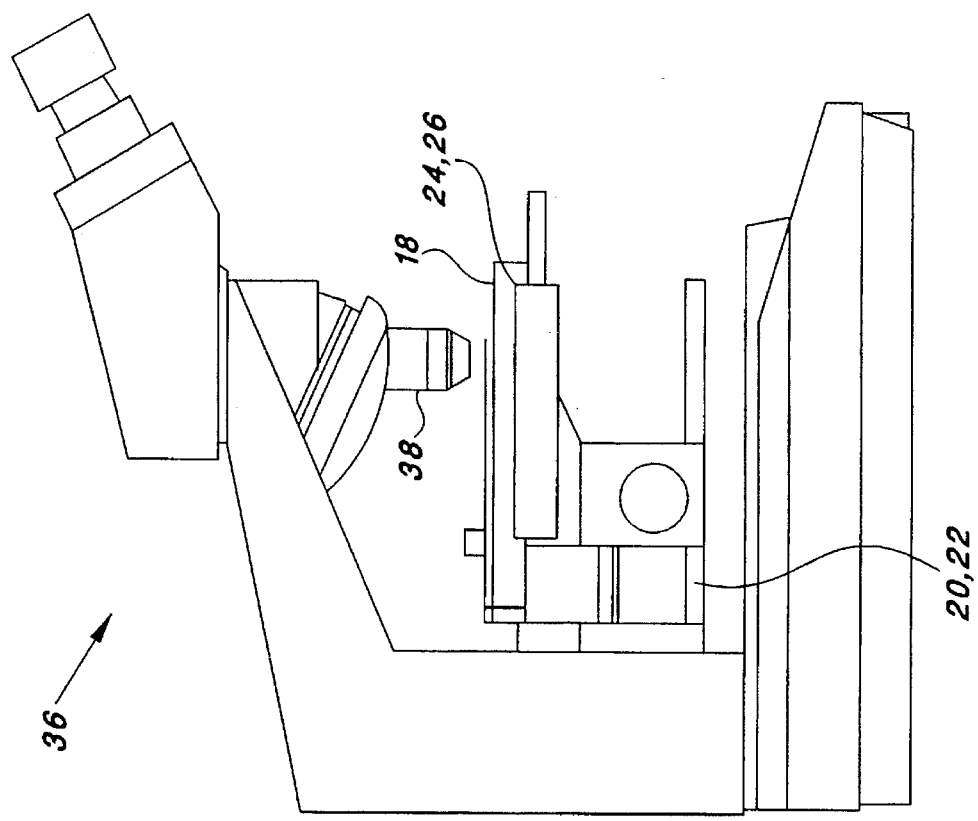

Referring next to FIGS. 3A and 3B, side and front views, respectively, are shown of a microscope 36 that includes the x-axis stepper motor 20 (or first stepper motor), and the y-axis stepper motor 22 (or second stepper motor). Also shown are the x-axis encoder 24 (or first linear encoder) and the y-axis encoder 26 (or second linear encoder). The microscope 36 may be of conventional design. A suitable microscope is available as model BHT from Olympus of New York. The stepper motors 20, 22 are mounted beneath the stage 18 and move the stage 18 as described above. The encoders 24, 26 are mounted along adjacent edges of the stage 18, and also operate as described above. A suitable microscope stage 18, capable of being modified with the encoders 24, 26 and stepper motors 20, 22, is available as model BH2-SVR or BH2-SVL available from Olympus of New York.

Also shown as a part of the microscope 36 is a lens assembly 38 through which the operator can view a magnified image of a portion of a slide that is mounted on the stage 18. As the stage 18 is moved by the stepper motors, the image viewed by the lens assembly 38 also is moved so as to view another portion of the slide 18. Generally, the portion of the slide 18 that is viewed constitutes a field of view, however the field of view may be some lesser portion of the slide such as a lesser portion identified by cross-hairs, a circle or square, or the like.

Because the location of the stage 18 is precisely indicated by the x and y-axis position signals 24a and 26a as the stage 18, and therefore the field of view, is moved, the precise position of the field of view is also represented by the x and y-axis position signals.

Figure 4:
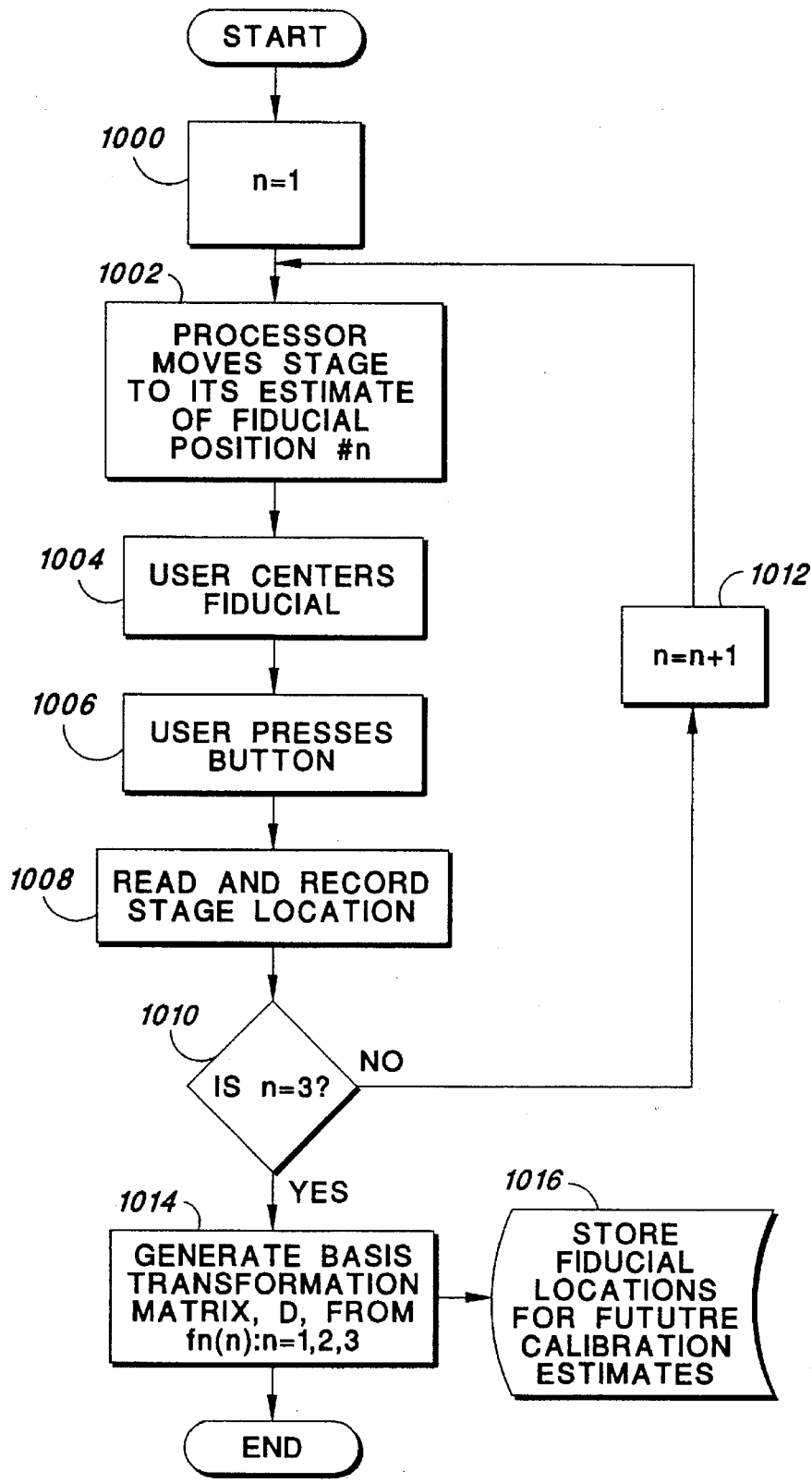
FIG. 4 is a flow diagram showing steps traversed by the microscopic screening apparatus of FIG. 1 during a setup phase.

Referring next to FIG. 4 a flow diagram is shown of steps traversed by the microscopic screening apparatus during a setup phase. In operation, a setup routine of the control program is executed within the processor 16 during the setup phase. Before beginning the setup process, however, the calibration slide 28 is mounted against the stage 18 by the first operator (e.g., the cytotechnologist or pathologist).

The setup routine is initialized (Block 1000) by setting a counter α (or second counter) equal to one. Note that the second counter may be a location in a memory device, or may be a separate integrated circuit counter. It is to be understood, however that the counter α need not be an integrated circuit capable of executing counting function, but can be merely located in the memory device that is accessed by the processor so as to perform functions of an integrated circuit counter. Next, the processor 16 instructs the interface unit 14 using the control signal 14a (which is preferably a command signal to the PC-23 interface unit generated in response to the control program) to move the stage 18 to an estimated location of the first fiducial 30. The estimated location of the first fiducial is preprogrammed into the processor. In response to the control signal 14a, the interface unit generates the x and y-axis positioning signals 20a and 22a, and in response to the x and y-axis positioning signals, the stepper motors 20 and 22 move (Block 1002) the stage 18 so that the estimated location of the first fiducial is at, or within the field of view.

When the processor has positioned the field of view on the estimated location, the cytotechnologist centers (Block 1004) the fiducial 30, if necessary. This may be accomplished by the cytotechnologist operating a digitizing device such as a joy stick, mouse, or trackball 17 that is coupled to the processor 16. Such digitizing devices are of conventional design and are well known in the art. When the first fiducial 30 is thus centered, the cytotechnologist indicates to the processor that the location of the first fiducial is now ready to be recorded. Such indication may be accomplished by the cytotechnologist pressing or "clicking" a button (Block 1006), as is known in the art. In response to the indication from the cytotechnologist, the location of the stage, as indicated by the location signal 16a, is read and recorded (Block 1008) in the memory device within the processor. The memory device may be a conventional integrated circuit memory device, or may be a magnetic disk (floppy disk 16b or hard disk 16c) or tape, a punch card, an optical disk, or any other volatile or non-volatile memory or the like. As mentioned above, the location of the stage 18 is determined in response to the location signal 16a, which is generated by the interface unit in response to the x and y-axis position signals 24a and 26a that are generated by the encoders 24, 26.

Next, the counter $\alpha$ is tested (Block 1010) to see whether it has reached three, and then incremented (Block 1012). The processor 16 causes the stepper motors to move (Block 1002) the stage 18 to the location of the second fiducial 32 in the manner described above and again the cytotechnologist centers the fiducial (Block 1004). The cytotechnologist indicates that the second fiducial 32 is positioned (Block 1006), and the location of the second fiducial is determined and stored (Block 1008).

The counter $\alpha$ is again tested (Block 1010), and incremented (Block 1012). The processor 16 moves the stage 18 (Block 1002) to the position of the third fiducial 34 and the cytotechnologist centers the fiducial (Block 1004). The cytotechnologist indicates that the third fiducial is positioned (Block 1006), and the location of the third fiducial is determined (Block 1008) and stored. At this point the calibration of the microscope system is complete.

The counter $\alpha$ is tested again (Block 1010), and because it has now reached three, a first transformation matrix $D^{-1}$ is generated (Block 1014). The transformation matrix $D^{-1}$ is defined as follows:

$$D^{-1} = \frac{1}{\det D} \begin{bmatrix} f_1^2 - f_2^2 & f_2^1 - f_1^1 \\ f_2^2 - f_3^2 & f_3^1 - f_2^1 \end{bmatrix},$$

wherein $$\det D = [(f_3^1 - f_2^1)(f_1^2 - f_2^2) - (f_1^1 - f_2^1)(f_3^2 - f_2^2)],$$

and wherein coordinates $f_1^1$, $f_1^2$ represent the location of said first fiducial, coordinates $f_2^1$, $f_2^2$ represent the location of the second fiducial, and coordinates $f_3^1$, $f_3^2$ represent the location of the third fiducial (as determined based on the location signal from the cytotechnologist's microscopic screening apparatus). The stored locations of the fiducials are also used to adjust the preprogrammed locations in the processor 16 of the fiducials (Block 1016), thereby improving the estimated locations of the fiducials utilized during subsequent calibrations of the first microscope system.

Finally, the cytotechnologist selects a scan area on the sample containing slide by, e.g., moving the field of view to the upper left corner of a rectangle that defines the scan area, and then moving the field of view to the lower right corner of the rectangle. The scan area, i.e., the rectangle, defines limits that will be utilized by the processor 16 during execution of a storage phase, described below, to determine the area of the sample containing slide over which scanning of the sample containing slide will occur. Note that instead of a single rectangular area, the scan area may be of any geometric shape, and may consist of multiple discontinuous areas of the sample-containing slide. The cytotechnologist also selects a scan velocity for the scan, or a step size and a step delay; selects a scan overlap; and selects a starting point for the scan. Such selections are discussed more completely below.

Figure 5:
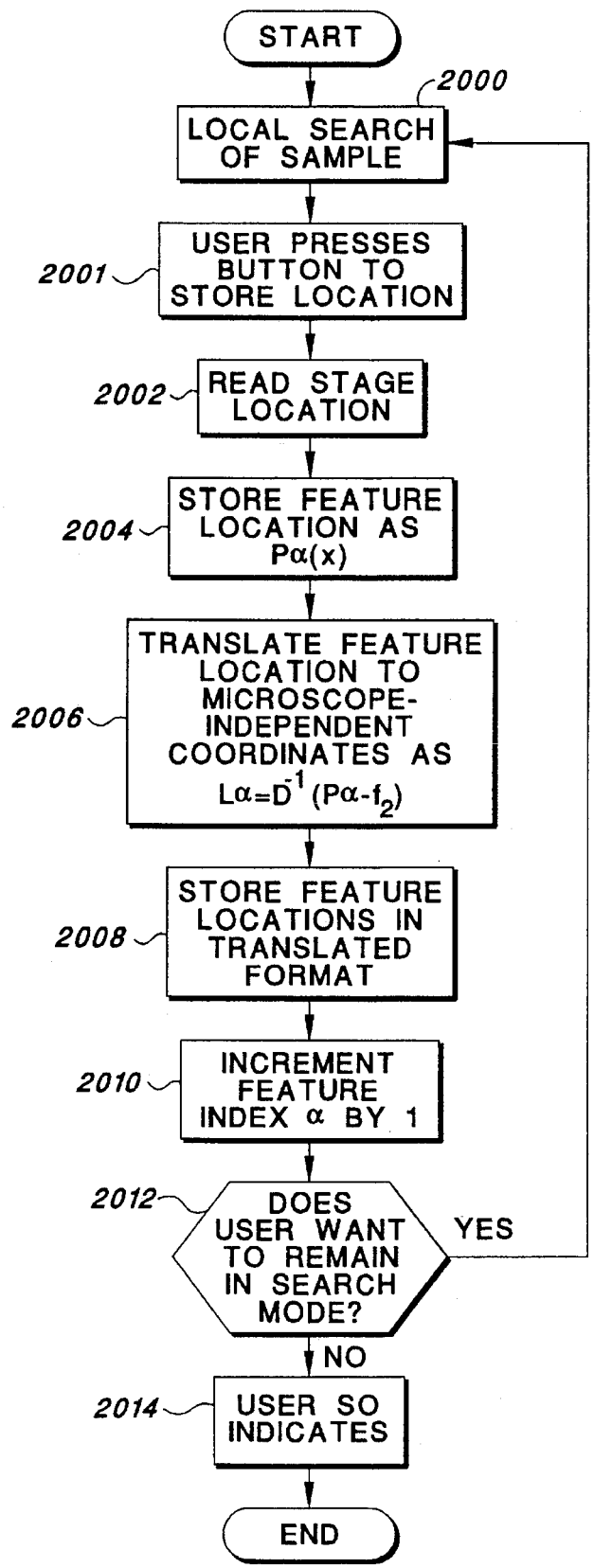
FIG. 5 is a flow diagram showing steps traversed by the microscopic screening apparatus of FIG. 1 during a storage phase.

Referring next to FIG. 5, a flow diagram is shown of steps traversed by the microscopic screening apparatus during a storage phase. The storage phase may be carried out by the processor 16 in response to the control program. Generally, before the storage phase begins, the cytotechnologist removes the calibration slide 28 from the stage 18 and mounts a sample containing slide against the stage. The sample containing slide contains a sample, which may consist of human cells, and which may contain one or more possible abnormal cells (atypia).

The cytotechnologist scans (Block 2000) the sample containing slide for such atypia by moving the stage, and therefore the field of view, across the sample (Block 2000). This may be done manually by the cytotechnologist using the digitizing device (e.g., 17), as described above, or may be done in response to the processor 16 executing a scanning subroutine. In response to the scanning subroutine, the processor 16 generates a control signal 14a that causes the stepper motors 20, 22 to move the stage 18 in a prescribed scan pattern such that the field of view is moved across the entire scan area (or all scan areas) in a prescribed manner.

Specifically, the processor 16 generates the control signal 14a and instructs the interface unit 14 to position the field of view at, e.g., the upper left corner of the rectangle that is the scan area. This is accomplished by the processor 16 generating a "GOTO" command for specific x-axis and y-axis coordinates of the upper left corner of the rectangle. The positioning servos are used to assure that the field of view is properly positioned at the specific x and y-axis coordinates. Next, the processor 16 generates a "VELOCITY" command wherein a direction of travel and a speed for the field of view to scan across the sample-containing slide are specified. In response to the "VELOCITY" command, the interface unit 14 scans the field of view toward the upper right corner of the scan area at the scan velocity (set by the cytotechnologist during execution of the setup routine) by moving the field of view along a straight line. When the field of view reaches the upper right corner of the scan area, as detected by the linear encoders 24, 26 and indicated by the location signal 16a in response to the x and y-axis position signals 24a, 26a, the processor 16 steps the field of view toward the lower right corner by a prescribed step. The prescribed step positions the field of view to scan back across the slide from right to left and provides for the scan overlap between successive scans. (The scan overlap is set by the cytotechnologist during execution of the setup routine.) The scan overlap is an area along the lower edge of a previous scan that is rescanned at the top edge of the current scan. The scan overlap assures that the entire scan area is scanned, and helps to assure that no atypia are missed because they are too near to the edge of a scan to be clearly viewed by cytotechnologist.

In response to another "VELOCITY" command from the processor 16, the field of view is again scanned across the sample at the scan velocity. This subsequent scan follows a straight line parallel to that of the previous scan, but is toward the left edge of the scan area, i.e., right to left. The field of view scans across the scan area until it reaches the right edge of the scan area, at which time it steps toward the lower left edge of the scan area by the prescribed step.

This process is repeated until the entire scan area has been scanned by the cytotechnologist. As alternatives, the cytotechnologist can select scan patterns that scan bottom to top, left to right or right to left stepping between successive scans, with right or left, top to bottom or bottom to top scanning, respectively. Furthermore, instead of using the "VELOCITY" command to realize the above-described velocity-type motion profile, the "GOTO" command, in conjunction with the step size and step delay (defined during the setup routine), can be utilized to realize a frame-type motion profile. Furthermore, in any of these motion profiles, the cytotechnologist can vary the scan velocity at any time during the scan using the digitizing device.

When using the frame type motion profile, the processor 16 generates the control signal 14a and instructs the interface unit 14 to position the field of view at, e.g., the upper left corner of the rectangle that is the scan area. This is accomplished by the processor 16 generating the "GOTO" command for the specific x-axis and y-axis coordinate of the upper left corner of the rectangle that is the scan area. The positioning servos can be used to assure that the field of view is properly positioned at the specific x and y-axis coordinates. Next, the processor 16 waits for a period defined by the scan delay and then generates the "GOTO" command. This "GOTO" command instructs the interface unit 14 to move the field of view toward the upper right corner of the scan area to a subsequent area, or frame, adjacent to the portion of the sample that is viewed when the field of view is in the upper left corner of the scan area. The area viewed when the field of view is in the upper left corner overlaps with the subsequently viewed area by the scan overlap in order to help assure that the entire slide is thoroughly scanned. Next, the processor 16 again waits for the scan delay, and another "GOTO" command is issued by the processor 16 in order to move the field of view again toward the upper right corner of the scan area to the next frame. This process of waiting and moving is repeated until the field of view reaches the right edge of the scan area. Then, the processor 16 steps the field of view toward the lower right corner of the scan area by the prescribed step and waits for the period defined by the scan delay. The process of waiting and moving is again repeated so as to move the field of view frame-by-frame back toward left edge of the scan area. In this way, the frame-type motion profile is realized, as an alternative to the velocity-type motion profile.

The scanning routine also allows the cytotechnologist to manually deviate from the selected scan pattern by operating the digitizing device (e.g., 17). Thus, the cytotechnologist is able to position groups of cells within the portion of the slide that is viewed, even though the scan pattern would otherwise bring only part of the group into the portion of the slide that is viewed (during the current scan, and the remainder of the group into the portion of the slide that is viewed on the subsequent scan). This operation is described more completely below.

In any case, when the cytotechnologist locates a possible atypium (and centers the possible atypium if necessary using the digitizing device) he or she indicates that a possible atypium has been located by pressing the button or "clicking" (Block 2001). In response to this indication, the processor 16 reads the location signal 16a (Block 2002) and temporarily stores such signals (Block 2004). The location signal 16a is indicative of the x and y-axis position signals 24a, 26a that are generated by the linear encoders 24, 26, and therefore the location signal 16a indicates stage location while the field of view is on the possible atypium.

In accordance with the present invention, the stage location is translated from the encoder-based coordinates (microscope-dependent coordinates), as indicated by the location signal 16a, into a microscope-independent coordinate system (Block 2006). Such transformation may be achieved as follows:

(1) Read the location of the possible atypium $p_\alpha^1$, $p_\alpha^2$ which is indicated by the location signal 16a;

(2) Calculate $(p_\alpha - f_2)$, where $p_\alpha$ is a vector representation of the location of the possible atypia $p_\alpha^1$, $p_\alpha^2$, and $f_2$ is a vector representation of the location of the second fiducial $f_2^1$, $f_2^2$; and (3) Calculate $D^{-1}(p_\alpha - f_2)$, and where $p_\alpha - f_2$ is as defined above and wherein $$D^{-1} = \frac{1}{\det D} \begin{bmatrix} f_1^2 - f_2^2 & f_2^1 - f_1^1 \\ f_2^2 - f_3^2 & f_3^1 - f_2^1 \end{bmatrix},$$

wherein $$\det D = [(f_3^1 - f_2^1)(f_1^2 - f_2^2) - (f_1^1 - f_2^1)(f_3^2 - f_2^2)],$$

as described above.

Note that $f_2$ is the origin of the microscope-independent coordinate system. Thus, $p_\alpha - f_2$ represents a translation of the origin of a first microscope-dependent coordinate system to the microscope-independent coordinate system (independent of the encoders). After the origin is translated, the transformation matrix accounts for magnitudinal (i.e., scale) differences, and for angular differences between the microscope-independent coordinate system and the first microscope-dependent coordinate system. Note that the angular differences include potentially independent angular differences in the x and y-axes. Thus, not only is rotation possible between the two coordinate systems, but the axes of the coordinate systems may be rotated, relative to one another, by differing amounts.

Note that the above transformation transforms the location of the possible atypia in terms of the encoders $p_\alpha$ in the first microscope-dependent coordinate system into a location in terms of the three fiducials $L_\alpha$ in the microscope-independent coordinate system.

The translated location of the possible atypium in the microscope-independent coordinate system is then stored in the memory device of the processor (Block 2008). Next, a feature counter n (or first counter), which indicates the number of features stored, is incremented (Block 2010). The feature counter n may be a location in the memory device or an integrated circuit counter, as with the counter $\alpha$. The cytotechnologist then indicates whether he or she wants to remain in search mode (Block 2012). In the event the cytotechnologist does want to remain in search mode (Block 2012), the processor allows the cytotechnologist to continue searching the sample (Block 2000) using the digitizing device for position control. In the event the cytotechnologist does not want to continue searching the sample (Block 2012), he or she so indicates by, e.g., pressing the "END" key on the keyboard (Block 2014), and the storage phase terminates. In this way, the locations of possible atypia within a sample containing slide are located and stored in the memory device.

As an alternative embodiment of the above described process, the location of the feature in the first microscope-dependent coordinate system, instead of being stored temporarily, may be stored in the memory device along with the locations of the fiducials in the first microscope-dependent coordinate system. The above described transformation of the location of the at least one feature from the first microscope-dependent coordinate system into the microscope-independent coordinate system, in this alternative embodiment, is performed during execution of a relocating program (described below) immediately before transformation of the location of the at least one feature from the microscope-independent coordinate system into the second microscope-dependent coordinate system. In this alternative embodiment, after the above-described coordinate transformation (from the first microscope-dependent coordinate system to the microscope-independent coordinate system) is performed, the location of the at least one feature is stored temporarily using the microscope-independent coordinate system, before being transformed to the second microscope-dependent coordinate system.

Note that in this alternative embodiment, the locations of the first, second and third fiducials must be stored in the memory device along with the location of the at least one feature in the first microscope-dependent coordinate system. In the preferred embodiment, wherein the location of the at least one feature is translated into the microscope independent coordinate system during the storage phase, only the location of the at least one feature in the microscope-independent coordinate system needs to be stored (more than temporarily) in the memory device.

Figure 6:
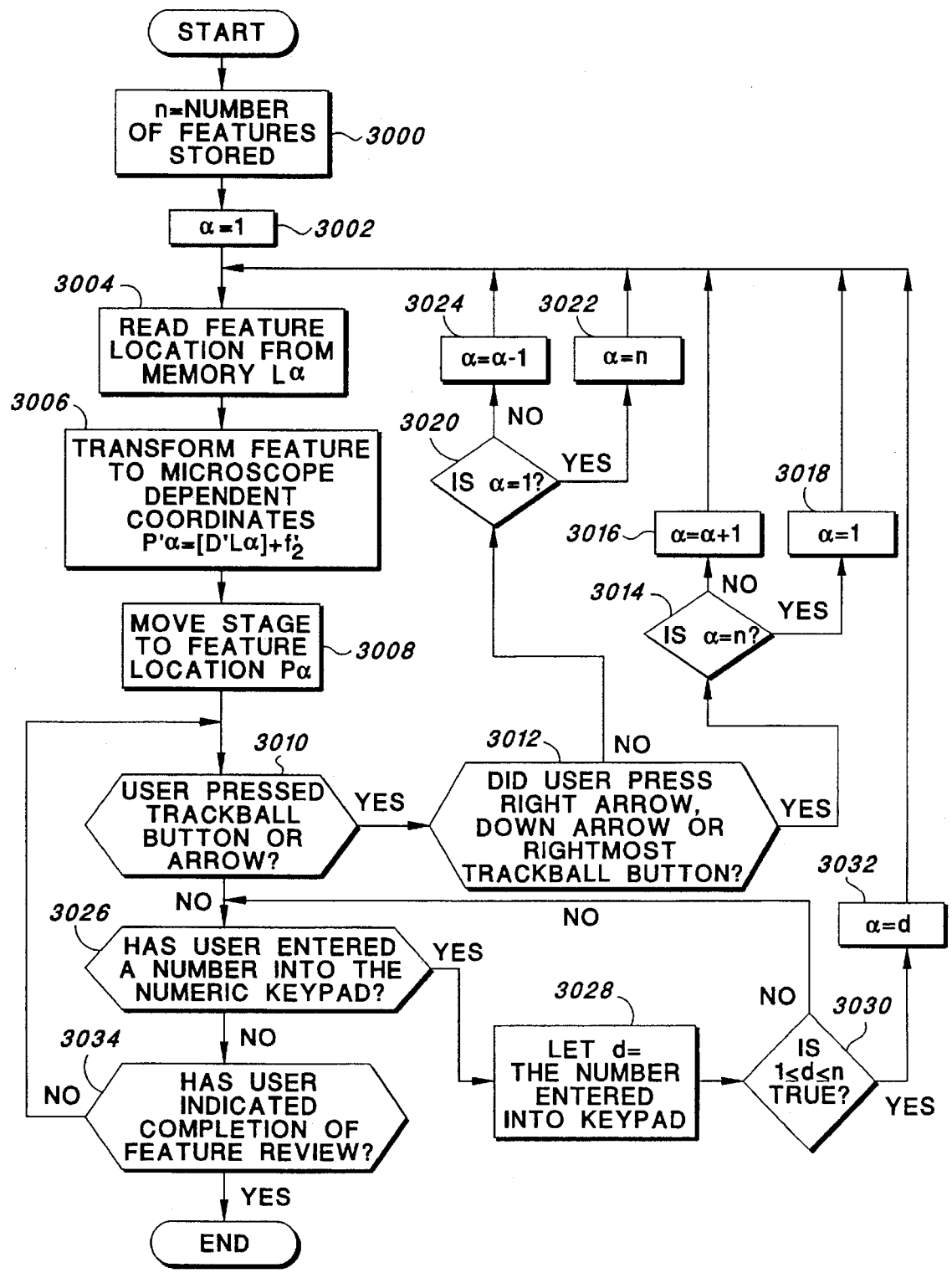
FIG. 6 is a flow diagram showing steps traversed by the microscopic screening apparatus of FIG. 1 during a retrieval (or relocating) phase.

Referring next to FIG. 6, a flow diagram is shown of steps traversed by the microscopic screening apparatus during a retrieval (or relocating) phase.

The relocating phase may be carried out by the processor 16 in response to a relocating program. Typically, the relocation will be done by a second operator (e.g., the pathologist) responsible for reviewing the possible atypia located by the cytotechnologist. If the pathologist is using a different microscope and stage (also having a pair of encoders, pair of stepper motors, an interface unit and a processor) than the cytotechnologist, as is typically the case, the pathologist will first need to calibrate his or her microscope by traversing calibration steps (Blocks 1000 through 1012) of the setup phase as described above using a second calibration slide. The pathologist may use the same calibration slide (the first calibration slide) to calibrate his or her microscope and stage, or may use a second calibration slide that contains fourth, fifth and sixth fiducials. The fourth, fifth, and sixth fiducials are in substantially the same positions on the second calibration slide as the first, second and third fiducials are in on the first calibration slide, respectively. The tolerance between the first, second and third fiducials, and the fourth, fifth and sixth fiducials, respectively, is dependent on the particular application of the present invention-based on the size of the features to be relocated, how difficult the features are to manually relocate once the field of view is moved to a location near the features, and generally, the precision desired for the particular application.

During the execution of the calibration steps, a second transformation matrix will be generated as follows:

$$\overline{A_\alpha} = D' \overline{L_\alpha}$$

wherein $$D' = \begin{bmatrix} f_3^1 - f_2^1 & f_1^1 - f_2^1 \\ f_3^2 - f_2^2 & f_1^2 - f_2^2 \end{bmatrix},$$

wherein coordinates $f_1^1$, $f_1^2$ represent the location of the fourth fiducial coordinates $f_2^1$, $f_2^2$ represent the location of the fifth fiducial and coordinates $f_3^1$, $f_3^2$ represent the location of the sixth fiducial. Note that the prime "'" indicates that the second transformation matrix and the three fiducial locations immediately above are determined using the location signal generated by the pathologist's interface unit, whereas the first transformation matrix and previously mentioned fiducial locations are determined using the cytotechnologists microscopic screening apparatus.

Next, the pathologist removes the calibration slide and mounts the sample containing slide containing the previously located possible atypia. The pathologist instructs the microscopic screening apparatus to locate the first atypia by pressing the button or "clicking". In response to such instruction, the retrieval phase begins by setting a first flag n equal to the number of feature locations stored in the memory device (Block 3000) and setting a second flag $\alpha$ equal to "1" (Block 3002). Next, the stored location of the first atypium is read from the memory device (Block 3004). Note that the memory device that stores the location of the first atypium is shared between the cytotechnologist's microscope system and the pathologist's microscope system. Such sharing may be achieved by using a common integrated circuit memory device, a removable magnetic or optical disk or tape, a removable punch card, a local or wide area network, a telecommunications network (and a modem for each microscope system in the case of an analog telecommunications network), a wireless communications network, or the like. This type of memory sharing is well known in the art.

Next, the stored location is transformed from the microscope-independent coordinate system to an encoder-based coordinate system (Block 3006) for the pathologist's microscopic screening apparatus (that is, a second microscope-dependent coordinate system), as follows:

(1) Calculate $[D'L_\alpha]$, where D' is defined above, and wherein $L_\alpha$ is the stored location of the possible atypium using the microscope-independent coordinate system; and (2) Calculate $[D'L_\alpha]+f_2'$, where $[D'L_\alpha]$ is as calculated above, and wherein $f_2'$ is a vector representation of the location of the second fiducial as stored using the pathologist's microscopic screening apparatus (using the second microscope-dependent coordinate system).

Note that $f_2'$ is the origin of the microscope-independent coordinate system. Thus, this calculation represents a translation from the origin of the microscope-independent coordinate system to the origin of the second microscope-dependent coordinate system.

In response to the transformation, the processor 16 causes the stage 18 to move to the stored location of the first (of possibly several) possible atypium using the stepper motors 20, 22 and the encoders 24, 26 as the positioning servo (Block 3008), described above. Once the stage 18, and therefore the field of view, is positioned at the first possible atypium, the pathologist can make a determination as to whether or not a particular possible atypium is in fact an abnormal cell, such as a cancerous cell.

If after completing his or her analysis of the first possible atypium (feature) the pathologist indicates that his or her analysis is complete by pressing the button or "clicking" (Block 3010), then the microscope system tests whether the pathologist pressed a right arrow key or a down arrow key on a keyboard that is coupled to the processor, or a secondary button on the digitizing device (Block 3012). Keyboards coupled to processors such as the one used to implement the present invention are commonly used and known in the art, as are right and down arrow keys on the keyboard, and secondary buttons of trackballs. If the pathologist has pressed the right or down arrow key or the secondary button (Block 3012), then the microscope system tests whether there are additional fiducials stored in the memory device (Block 3014). If there are additional features stored in the memory device, i.e. the second flag $\alpha$ does not equal the first flag n, (Block 3014), the second flag $\alpha$ is incremented (Block 3016) and the location of feature is read from the memory device (Block 3004) and transformed (Block 3006), and the stage is moved (Block 3008), etc., as described above. If there are no additional features stored in the memory device, i.e., the second flag α equals the first flag n, (Block 3014), the second flag is set to one (Block 3018) (which corresponds to the first feature stored in the memory device) and execution continues with the reading of the first feature location from the memory device (Block 3004).

In the event the pathologist does not press the right or down arrow or the secondary trackball button (Block 3012), the second counter α is tested to see whether it is equal to one (Block 3020). In the event the second counter α is equal to one (Block 3020), the second counter α is set equal to the first counter n (Block 3022), and in the event the second counter α is not equal to one (Block 3020), the second counter α is decremented by one (Block 3024).

If after completing his or her analysis of the first possible atypium (feature) the pathologist does not indicate that his or her analysis is complete by pressing the button or "clicking" (Block 3010), but instead presses a number key or keys on the keyboard (Block 3026), then the value corresponding to the number key(s) is loaded into a third counter d (Block 3028). The third counter may be a location in the memory device or an integrated circuit counter, as with the counter α, and the feature counter n. Number keys such as are used to implement the present invention are commonly used and known in the art, and preferably include number keys corresponding to the digits zero through nine. If the value in the third counter d is greater or equal than one, but less than or equal to the first (or feature) counter n (Block 3030), the second counter α is set equal to the third counter d (Block 3032), and execution continues with reading the feature location from the memory device (Block 3004). In the event the third counter d is not greater than or equal to one and less than or equal to the first counter n (Block 3026), the pathologist is given another chance to press a number key(s) (Block 3026) and may receive an error message (not shown) indicating that the number key(s) pressed is out of range, i.e., greater or equal than one, but less than or equal to the first counter n.

If after completing his or her analysis of the first possible atypium (feature) the pathologist has not pressed the trackball button or an arrow key (Block 3010) and has not pressed a number key(s) (Block 3026), but instead presses an "END" key on the keyboard (Block 3034), the retrieval phase terminates. Note that the "END" key may be a key marked "End" or any other key on the keyboard other than the number keys and the arrow keys that are used to indicate that the pathologist wishes to terminate the retrieval phase. In the event the pathologist has not pressed the trackball button or an arrow key (Block 3010), has not pressed a number key(s) (Block 3026), and does not press the "END" key (Block 3034), execution continues with testing whether the button or the arrow key has been pressed (Block 3010), as described above.

Thus, a pathologist is able to quickly relocate possible atypia identified by a cytotechnologist using an automated microscopic screening apparatus.

Figure 7:
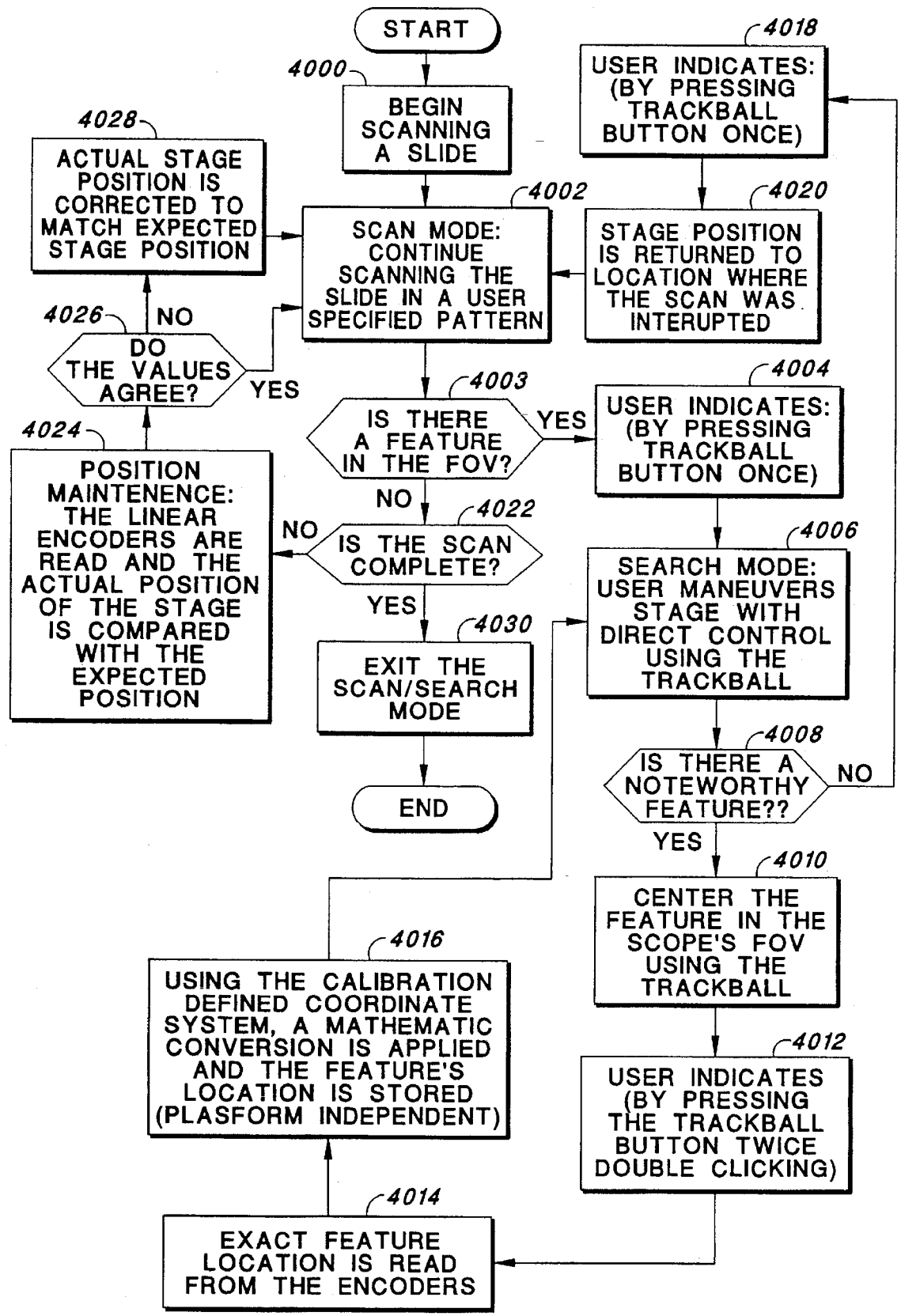
FIG. 7 is a flow diagram showing steps traversed during the storage phase of FIG. 5, including additional steps that comprise a scanning routine.

Referring next FIG. 7, a flow diagram is shown of the steps traversed during the storage phase, including steps that comprise a scanning subroutine and a searching subroutine. Upon initializing the scanning routine, the stage begins to scan the slide as described above, using one of the above-described scanning patterns and motion profiles (Blocks 4000 and 4002). Upon viewing a possible atypium within the portion of the slide that is viewed (Block 4003), the cytotechnologist indicates that a possible atypium has been viewed by pressing or "clicking" the button (Block 4004).

The scanning routine then enters a search mode (Block 4006) wherein the cytotechnologist manually locates the stage using the digitizing device (e.g., 17). In the event the cytotechnologist wishes to record the location of the possible atypium (Block 4008), the cytotechnologist centers the atypium (Block 4010) within or at the field of view and presses the button twice quickly (Block 4012), or "double-clicks". The term "double-click" is commonly used and well known in the art. The location of the atypium is read from the encoders (Block 4014) and stored (Block 4016) using the microscope independent coordinate system as described above. The microscopic screening apparatus then resumes the search mode (Block 4006) wherein the cytotechnologist manually locates the stage using the digitizing device.

When the cytotechnologist wishes to leave the search mode and resume scanning of the slide, or in the event the cytotechnologist does not wish to record the location of the possible atypium, the cytotechnologist presses or "clicks" the button (Block 4018). In response to the pressing of the button, the stage 18 is returned to the location at which the scan was interrupted and resumes scanning the slide (Block 4020). The cytotechnologist may stop the scan at any time and enter the search mode by again pressing or "clicking" the button (Blocks 4003 and 4004).

After the stage has moved from, for example, left to right across the entire slide (Block 4022), the encoders 24, 26 are read and the actual position of the stage 18 is compared with the expected position of the stage by the positioning servo software (Block 4024) In the event the actual and expected positions differ (Block 4026), the position of the stage 18 is adjusted (Block 4028) and the scan mode continues by moving the stage downward for the next scan pass, which is from right to left across the stage (Block 4002).

After the entire area of the slide has been scanned (Block 4022), the scanning routine terminates (Block 4030). Thus, the sample contained on the slide is scanned for possible atypia. When the possible atypia are located, the cytotechnologist interrupts the scan, and enters a searching routine. After confirming the location of the possible atypium, the invention records its location using the microscope-independent coordinate system.

While the invention herein disclosed has been described by means of specific embodiments and applications thereof, numerous modifications and variations could be made thereto by those skilled in the art without departing from the scope of the invention set forth in the claims.

In particular, while the first microscope system of above embodiment stores the location of the at least one feature using the microscope-independent coordinate system, and the second microscope system recalls such location, it is to be understood that either (a) storage by the first microscope system of the fiducial locations and the location of the at least one feature using the first microscope-dependent coordinate system and recalling by the second microscope system, or (b) storage of the fiducial locations using the second microscope system using the second microscope-dependent coordinate system, and subsequently the location of the at least one feature using the first microscope system using the second microscope-dependent coordinate system (transformation having been accomplished within the first microscope system), are possible within the scope of the present invention depending on which of the two microscope systems (which may be the same microscope system) performs the above-described translational, angular, and magnitudinal transformations.

Furthermore, while the present invention has been described hereinabove as utilizing particular scan patterns and motion profiles, many possible scan patterns and/or motion profiles are contemplated within the scope of this invention. Selection of such scan patters and/or motion profiles will depend on the particular application of the present invention and personal preferences of its operators.

What is claimed is:

1. A method for locating in a second microscope system at least one feature that is previously located within a sample viewed through a first microscope system, the first and second microscope systems including stages that are movable within first and second microscope-dependent coordinate systems relative to first and second lens assemblies, the location of the at least one feature being stored in a memory device using a microscope-independent coordinate system, the method comprising:

(a) mounting the sample against the second stage of the second microscope system wherein a second field of view is defined by the second lens assembly;

(b) recalling from the memory device the location of the at least one feature;

(c) transforming the location of the at least one feature in the microscope-independent coordinate system to the second microscope-dependent coordinate system; and (d) in response to step (c), moving the second field of view so as to position the at least one feature in the sample in the second field of view;

whereby the at least one feature is located within the sample being viewed through the second microscope system.

2. A method for locating in a second microscope system at least one feature that is previously located within a sample viewed through a first microscope system, the first and second microscope systems including first and second stages that are movable within first and second microscope-dependent coordinate systems relative to first and second lens assemblies, the method comprising:

(a) mounting a sample against the first stage of the first microscope system, wherein the sample contains the at least one feature;

(b) viewing at least a portion of the sample within a first field of view defined by the first lens assembly;

(c) moving the first field of view to and generating signals indicative of the location of the at least one feature, the location of the at least one feature being defined in the first microscope-dependent coordinate system;

(d) transforming the location of the at least one feature from step (c) to a microscope-independent coordinate system;

(e) storing in a memory device the location of the at least one feature in the microscope-independent coordinate system;

(f) recalling from the memory device the location of the at least one feature;

(g) transforming the location of the at least one feature in the microscope-independent coordinate system to the second microscope-dependent coordinate system; and (h) in response to step (g), moving a second field of view defined by the second lens assembly so as to position the at least one feature in the sample in the second field of view;

whereby the at least one feature is located within the sample being viewed by the second microscope system.

3. The method of claim 2 including:

removing, after the moving in step (c) and before the moving in step (h), the sample from the first stage; and then mounting the sample against the second stage of the second microscope.

4. The method of claim 2 wherein said first microscope system and said second microscope system are the same microscope system.

5. In a microscope system, a method of relocating features that are located within a sample being viewed through the microscope system comprising:

(a) viewing a first calibration means on a first stage of a first microscope, wherein a first field of view is defined by the first microscope, and wherein the first calibration means contains at least one fiducial marking;

(b) calibrating the first microscope by recording a location of the at least one fiducial marking, using a first microscope-dependent coordinate system;

(c) mounting a sample against the first stage, wherein the sample contains at least one feature;

(d) moving the first field of view so as to position the first field of view at a location wherein the at least one feature is in the first field of view, the location being defined in the first microscope-dependent coordinate system;

(e) in response to the calibrating in step (b) transforming the location to a microscope-independent coordinate system;

(f) storing the location in the microscope-independent coordinate system;

(g) removing the sample from the first stage;

(h) viewing a portion of a second calibration means on a second stage of a second microscope, wherein a second field of view is defined by the second microscope, wherein the second calibration means contains the at least one fiducial marking, the second calibration means being the same as or substantially identical to the first calibration means, the at least one fiducial marking being in a substantially similar location on the second calibration means as the at least one fiducial marking is in on the first calibration means;

(i) calibrating the second microscope by recording a location of the at least one fiducial marking on the second calibration means, using a second microscope-dependent coordinate system;

(j) mounting the sample against the second stage;

(k) in response to step (j), transforming the location stored in step (f) using the microscope-independent coordinate system to the second microscope-dependent coordinate system; and (l) in response to step (k), moving the second field of view so as to position the second field of view at a location wherein the at least one feature in the sample is in the second field of view;

whereby the at least one feature is relocated within the sample being viewed through the second microscope.

6. In a microscope system, a method of relocating features that are located within a sample being viewed through the microscope system comprising:

(a) viewing, in a first field of view defined by a lens assembly of the first microscope, a portion of a first calibration means on a first stage of the first microscope, wherein the first calibration means includes a first fiducial, a second fiducial, and a third fiducial, said first, second and third fiducials being at non-collinear points on the first calibration means;

(b) moving the first field of view to a location of the first fiducial, said location of the first fiducial being defined in a first microscope-dependent coordinate system;

19

(c) reading and storing the location of the first fiducial using the first microscope-dependent coordinate system;

(d) moving the first field of view to a location of the second fiducial, the location the second fiducial being defined in the first microscope-dependent coordinate system;

(e) reading and storing the location of the second fiducial using the first microscope-dependent coordinate system;

(f) moving the first field of view to a location of the third fiducial, the location of the third fiducial being defined in the first microscope-dependent coordinate system;

(g) reading and storing the location of the third fiducial using the first microscope-dependent coordinate system;

(h) mounting a sample against the first stage, wherein the sample contains at least one feature;

(i) moving the first field of view to a location wherein the at least one feature is in the first field of view, the location being defined in the first microscope-dependent coordinate system;

(j) reading and transforming the location in the first microscope-dependent coordinate system to a microscope-independent coordinate system;

(k) storing the location using the microscope-independent coordinate system;

(l) removing the sample from the first stage;

(m) viewing, in a second field of view defined by the second microscope, a portion of a second calibration means on a second stage of the second microscope, wherein the second calibration means includes a fourth fiducial, a fifth fiducial, and a sixth fiducial, said fourth, fifth and sixth fiducials being at non-collinear points on the second calibration means, said second calibration means being the same as or substantially identical to the first calibration means, and said fourth, fifth and sixth fiducials, respectively, being in the same or substantially similar locations on the second calibration means as the first, second and third fiducials, respectively, on the first calibration means;

(n) moving the second field of view to a location of the fourth fiducial, the location of the fourth fiducial being defined in a second microscope-dependent coordinate system;

(o) reading and storing the location of the fourth fiducial using the second microscope-dependent coordinate system;

(p) moving the second field of view to the location of the fifth fiducial, the location of the fifth fiducial being defined in the second microscope-dependent coordinate system;

(q) reading and storing the location of the fifth fiducial using the second microscope-dependent coordinate system;

(r) moving the second field of view to a location of the sixth fiducial, the location of the sixth fiducial being defined in the second microscope-dependent coordinate system;

(s) reading and storing the location of the sixth fiducial using the second microscope-dependent coordinate system;

(t) mounting the sample against the second stage;

(u) transforming the location stored in step (k) using the microscope-independent coordinate system to the second microscope-dependent coordinate system; and

20

(v) in response to the transforming in step (u), moving the second field of view to a location wherein the at least one feature in the sample is in the second field of view;

whereby the at least one feature is relocated within the sample being viewed through the second microscope.

7. The method of claim 6 wherein in steps (a) and (m) said first and second calibration means comprise first and second calibration slides.

8. The method of claim 7 wherein in step (m), the second calibration slide is the same calibration slide as the first calibration slide; and wherein the fourth fiducial is the same fiducial as the first fiducial, the fifth fiducial is the same fiducial as the second fiducial, and the sixth fiducial is the same fiducial as the third fiducial.

9. The method of claim 7 further comprising:

after storing in step (g), removing the first calibration slide from the first stage; and after storing in step (s), removing the second calibration slide from the second stage.

10. The method of claim 6 wherein step (j) comprises:

(j1) transforming translationally an origin of said first microscope-dependent coordinate system to the location of the second fiducial, as stored in step (e), and (j2) transforming angularly and magnitudinally the first microscope-dependent coordinate system to the microscope-independent coordinate system, including at least a first rotational transformation; and wherein step (u) comprises:

(u1) transforming angularly and magnitudinally the microscope-independent coordinate system to the second microscope-dependent coordinate system, including at least a second rotational transformation, and (u2) transforming translationally the location of the fifth fiducial, as stored in step (s), to an origin of the second microscope-dependent coordinate system.

11. The method of claim 10 wherein step (j) comprises:

(j1) transforming translationally an origin of the first microscope-dependent coordinate system to the location of the second fiducial, as stored in step (e), including calculating:

$$\overline{T_\alpha} = (\overline{p_\alpha} - \overline{f_2}),$$

wherein $\overline{T_\alpha}$ is a vector representation of the location of said at least one feature having been transformed translationally, wherein $\overline{p_\alpha}$ is a vector representation of the location of the feature using the first microscope-dependent coordinate system, and wherein $\overline{f_2}$ is a vector representation of the location of the second fiducial using the first microscope-dependent coordinate system, and (j2) transforming angularly and magnitudinally the first microscope-dependent coordinate system to the microscope-independent coordinate system, including calculating:

$$\overline{L_\alpha} = D^{-1}(\overline{T_\alpha}),$$

wherein $$D^{-1} = \frac{1}{\det D} \begin{bmatrix} f_1^2 - f_2^2 & f_2^1 - f_1^1 \\ f_2^2 - f_3^2 & f_3^1 - f_2^1 \end{bmatrix},$$

wherein $$\det D = [(f_3^1 - f_2^1)(f_1^2 - f_2^2) - (f_1^1 - f_2^1)(f_3^2 - f_2^2)],$$

wherein the first microscope-dependent coordinate system is a first oblique coordinate system wherein coordinates $f_1^1, f_1^2$ represent the location of the first fiducial as stored in step (c) coordinates $f_2^1$, $f_2^2$ represent said location of the second fiducial as stored in step (e), and coordinates $f_3^1$, $f_3^2$ represent the location of the third fiducial as stored in step (g), and $\overline{L_\alpha}$ is the location of the at least one feature translated to the microscope-independent coordinate system; and wherein step (u) comprises:

(u1) transforming angularly and magnitudinally the microscope-independent coordinate system to the second microscope-dependent coordinate system, the transforming angularly and magnitudinally including calculating:

$$\overline{A_\alpha} = D'\overline{L_\alpha}$$

wherein $$D' = \begin{bmatrix} f_3'^1 - f_2'^1 & f_1'^1 - f_2'^1 \\ f_3'^2 - f_2'^2 & f_1'^2 - f_2'^2 \end{bmatrix},$$

wherein the second microscope-dependent coordinate system is a second oblique coordinate system wherein coordinates $f_1'^1$, $f_1'^2$ represent the location of the fourth fiducial as stored in step (o) coordinates $f_2'^1$, $f_2'^2$ represent the location of the fifth fiducial as stored in step (q), and coordinates $f_3'^1$, $f_3'^2$ represent said location of said sixth fiducial as stored in step (s), and wherein $\overline{A_\alpha}$ is a vector representation of the location of the at least one feature having been angularly and magnitudinally transformed, and (u2) transforming translationally the location of the fifth fiducial, as stored in step (q), to an origin of the second microscope-dependent coordinate system, including calculating:

$$\overline{P_\alpha'} = \overline{A_\alpha} + \overline{f_2'}$$

wherein $\overline{p_\alpha'}$ is a vector representation of the location of the feature using the second microscope-dependent coordinate system, and wherein $\overline{f_2'}$ is a vector representation of the location of the fifth fiducial using the second microscope-dependent coordinate system.

12. The method of claim 6 wherein step (j) comprises:

(j1) transforming translationally an origin of said first microscope-dependent coordinate system to the location of the second fiducial, as stored in step (e), and (j2) transforming angularly the first microscope-dependent coordinate system to the microscope-independent coordinate system, including at least a first rotational transformation; and wherein step (u) comprises:

(u1) transforming angularly the microscope-independent coordinate system to the second microscope-dependent coordinate system, including at least a second rotational transformation, and (u2) transforming translationally the location of the fifth fiducial, as stored in step (q), to an origin of the second microscope-dependent coordinate system.

13. The method of claim 6 wherein step (j) comprises:

(j1) transforming translationally an origin of said first microscope-dependent coordinate system to the location of the second fiducial, as stored in step (e), and (j2) transforming magnitudinally the first microscope-dependent coordinate system to the microscope-independent coordinate system; and wherein step (u) comprises:

(u1) transforming magnitudinally the microscope-independent coordinate system to the second microscope-dependent coordinate system, and (u2) transforming translationally the location of the fifth fiducial, as stored in step (q), to an origin of the second microscope-dependent coordinate system.

14. In a microscope system, a method of relocating features that are located within a sample being viewed through the microscope system:

(a) viewing, in a first field of view defined by a first microscope, a portion of a first calibration means on a first stage of the first microscope, wherein the first calibration means contains a first fiducial, a second fiducial, and a third fiducial, said first, second and third fiducials being at non-collinear points on the first calibration means;

(b) moving the first field of view to a location of the first fiducial, the location of the first fiducial being defined in a first microscope-dependent coordinate system;

(c) reading and storing the location of the first fiducial using the first microscope-dependent coordinate system;

(d) moving the first field of view to a location of the second fiducial, the location the second fiducial being defined in the first microscope-dependent coordinate system;

(e) reading and storing the location of the second fiducial using the first microscope-dependent coordinate system;

(f) moving the first field of view to a location of the third fiducial, the location of the third fiducial being defined in the first microscope-dependent coordinate system;

(g) reading and storing the location of the third fiducial using the first microscope-dependent coordinate system;

(h) mounting a sample against the first stage, wherein the sample contains at least one feature;

(i) moving the first field of view to a location wherein the at least one feature is in the first field of view, the location being defined in the first microscope-dependent coordinate system;

(j) reading and transforming the location in the first microscope-dependent coordinate system to a microscope-independent coordinate system;

(k) reading and storing the location using the microscope-independent coordinate system;

(l) viewing, in a second field of view defined by the second microscope, a portion of a second calibration means, on a second stage of the second microscope, the second calibration means being substantially identical to the first calibration means;

(m) calibrating the second microscope by repeating steps (b) through (g) using the second calibration means and a second microscope-dependent coordinate system;

(n) mounting the sample against the second stage;

(o) transforming the location recorded in step (k) using the microscope-independent coordinate system to the second microscope-dependent coordinate system;

(p) in response to step (o), moving the second field of view to a location wherein the at least one feature in the sample is in the second field of view;

whereby the at least one feature is relocated within the sample being viewed through the second microscope system.

15. In a microscope system, a method of calibrating the microscope system:

(a) viewing, in a first field of view defined by a first microscope, a portion of a first calibration means on a first stage of the first microscope, wherein the first calibration means contains a first fiducial, a second fiducial, and a third fiducial, the first, second and third fiducials being at non-collinear points on the first calibration means;

(b) moving the first field of view to a location of the first fiducial, the location of the first fiducial being defined in a first microscope-dependent coordinate system;

(c) reading and storing the location of the first fiducial using the first microscope-dependent coordinate system;

(d) moving the first field of view to a location of the second fiducial, the location the second fiducial being defined in the first microscope-dependent coordinate system;

(e) reading and storing the location of the second fiducial using the first microscope-dependent coordinate system;

(f) moving the first field of view to a location of the third fiducial, the location of the third fiducial being defined in the first microscope-dependent coordinate system; and (g) reading and storing the location of the third fiducial using the first microscope-dependent coordinate system.

16. The method of claim 15 further comprising:

(h) viewing, in a second field of view defined by a second microscope, a portion of a second calibration means on a second stage of the second microscope, wherein the second calibration means contains a fourth fiducial, a fifth fiducial, and a sixth fiducial, the fourth, fifth and sixth fiducials being at non-collinear points on the second calibration means, the second calibration means being the same or substantially identical to said first calibration means, and said fourth, fifth and sixth fiducials, respectively, being in substantially similar locations on the second calibration means as said first, second and third fiducials, respectively, are in on said first calibration means;

(i) moving the second field of view to a location of the fourth fiducial, the location of the fourth fiducial being defined in the second microscope-dependent coordinate system;

(j) reading and storing the location of the fourth fiducial using the second microscope-dependent coordinate system;

(k) moving the second field of view to the location of the fifth fiducial, the location of the fifth fiducial being defined in a second microscope-dependent coordinate system;

(l) reading and storing the location of the fifth fiducial using the second microscope-dependent coordinate system;

(m) moving the second field of view to a location of the sixth fiducial, the location of the sixth fiducial being defined in the second microscope-dependent coordinate system; and (n) reading and storing the location of the sixth fiducial using the second microscope-dependent coordinate system;

wherein the first and second microscopes are calibrated.

17. In a microscope system, a method of storing the location of at least one feature within a sample being viewed through the microscope system comprising:

(a) viewing, in a field of view is defined by the microscope, a portion of a calibration means on a stage of the microscope system, wherein the calibration means contains a first fiducial, a second fiducial, and a third fiducial, the first, second and third fiducials being at non-collinear points on the calibration means;

(b) moving the field of view to a location of the first fiducial, the location of the first fiducial being defined in a microscope-dependent coordinate system;

(c) reading and storing the location of the first fiducial using the microscope-dependent coordinate system;

(d) moving the field of view to a location of the second fiducial, the location the second fiducial being defined in the microscope-dependent coordinate system;

(e) reading and storing the location of the second fiducial using the microscope-dependent coordinate system;

(f) moving the field of view to a location of the third fiducial, the location of the third fiducial being defined in the microscope-dependent coordinate system;

(g) reading and storing the location of the third fiducial using the microscope-dependent coordinate system;

(h) mounting a sample against the stage, wherein the sample contains at least one feature;

(i) moving the field of view to a location wherein the at least one feature is in the field of view, the location being defined in the microscope-dependent coordinate system;

(k) reading and transforming the location in the microscope-dependent coordinate system to a microscope-independent coordinate system; and (l) storing the location using the microscope-independent coordinate system.

18. In a microscope system, a method of relocating features that are located within a sample being viewed through the microscope system comprising:

(a) viewing, in a field of view defined by the microscope system, a portion of a calibration means on a stage of the microscope system, wherein the calibration means contains a first fiducial, a second fiducial, and a third fiducial, the first, second and third fiducials being at non-collinear points on the calibration means;

(b) moving the field of view to a location of the first fiducial, the location of the first fiducial being defined in a microscope-dependent coordinate system;

(c) reading and storing the location of the first fiducial using the microscope-dependent coordinate system;

(d) moving the first field of view to a location of the second fiducial, the location of the second fiducial being defined in the microscope-dependent coordinate system;

(e) reading and storing the location of the second fiducial using the microscope-dependent coordinate system;

(f) moving the first field of view to a location of the third fiducial, the location of the third fiducial being defined in the microscope-dependent coordinate system;

(g) reading and storing the location of the third fiducial using the first microscope-dependent coordinate system;

(h) using the location of the first, second and third fiducials stored in steps (c), (e) and (g), transforming a location of at least one feature of the sample that is recorded in a memory using a microscope-independent coordinate system to the microscope-dependent coordinate system; and (i) in response to step (h), moving the field of view so as to position the field of view on a location wherein the at least one feature of the sample is in the field of view when the sample is on the stage of the microscope system;

whereby the at least one feature is relocated within the sample being viewed by the microscope system.

19. In a microscope system, a method of relocating features that are located within a sample being viewed through the microscope system comprising:

(a) viewing, in a field of view defined by the microscope system, a portion of a calibration means on a stage of the microscope system, wherein the calibration means contains a fiducial;

(b) moving the field of view to a location of the fiducial, the location of the fiducial being defined in a microscope-dependent coordinate system;

(c) reading and storing the location of the fiducial using the microscope-dependent coordinate system;

(d) using the location of the fiducial stored in step (c), transforming a location of at least one feature of the sample that is recorded in a memory using a microscope-independent coordinate system to the microscope-dependent coordinate system; and (e) in response to step (d), moving the field of view so as to position the field of view on a location wherein the at least one feature in the sample is in the field of view when the sample is on the stage of the microscope system;

whereby the at least one feature is relocated within the sample being viewed by the microscope system.

20. An apparatus for locating in a second microscope system at least one feature that is previously located within a sample viewed through a first microscope system, the first and second microscope systems including stages that are movable within first and second microscope-dependent coordinate systems relative to first and second lens assemblies, the location of the at least one feature being stored in a memory device using a microscope-independent coordinate system, the apparatus comprising:

means for mounting the sample against the second stage of the second microscope system wherein a second field of view is defined by the second lens assembly;

means for recalling from the memory device the location of the at least one feature;

means for transforming the location of the at least one feature in the microscope-independent coordinate system to the second microscope-dependent coordinate system; and means for moving the second field of view so as to position the second field of view on a location wherein the at least one feature in the sample is in the second field of view;

whereby the apparatus relocates the at least one feature within the sample being viewed by the second microscope system.

21. An apparatus for locating in a second microscope system at least one feature that is previously located within a sample viewed through a first microscope system, the first and second microscope systems including first and second stages that are movable within first and second microscope-dependent coordinate systems relative to first and second lens assemblies defining first and second fields of view respectively, the apparatus comprising:

means for mounting a sample against the first stage of the first microscope system, wherein the sample contains the at least one feature;

means for viewing the sample within the first field of view;

means for moving the first field of view to and for generating signals indicative of the location of the at least one feature, the location of the at least one feature being defined in the first microscope-dependent coordinate system;

means for transforming the signals to indicate the location of the at least one feature in a microscope-independent coordinate system;

means for storing the location of the at least one feature in the microscope-independent coordinate system;

means for recalling the location of the at least one feature in the microscope-independent coordinate system;

means for transforming the location of the at least one feature in the microscope-independent coordinate system to the second microscope-dependent coordinate system; and means for moving the second field of view so as to position the second field of view on a location wherein the at least one feature in the sample on the stage is in the second field of view;

whereby the apparatus relocates the at least one feature within the sample being viewed by the second microscope system.

22. A microscope system including:

a first microscope having a first stage for supporting a sample containing at least one feature;

first calibration means for positioning on the first stage, wherein the first calibration means contains a first fiducial, a second fiducial, and a third fiducial, the first, second and third fiducials being at non-collinear points on the first calibration means;

means for viewing a portion of the first calibration means in a first field of view;

first means for calibrating the first microscope by storing a location of the first, second and third fiducials, respectively, using a first microscope-dependent coordinate system;

means for moving the first field of view to a location wherein the at least one feature is in the first field of view, the location of the at least one feature being defined in the first microscope-dependent coordinate system;

first means for transforming the location in the first microscope-dependent coordinate system to a microscope-independent coordinate system, the means for transforming being responsive to the first means for calibrating;

memory means for storing the location of the at least one feature using the microscope-independent coordinate system;

a second microscope having a second stage for supporting the sample;

second calibration means for positioning on the second stage, wherein the second calibration means is the same as or substantially identical to the first calibration means, the second calibration means having a fourth, fifth and sixth fiducial that are in substantially similar locations on the second calibration means as the first, second and third fiducials, respectively, are on the first calibration means;

means for viewing a portion of the second calibration means in a second field of view;

second means for calibrating the second microscope by storing a location of the fourth, fifth and sixth fiducials, respectively, using a second microscope-dependent coordinate system;

second means for transforming the location stored by the memory means to the second microscope-dependent coordinate system, the second means for transforming being responsive to the second means for calibrating; and means for moving the second field of view to a location wherein the at least one feature in the sample is in the second field of view;

whereby the at least one feature is relocated within the sample being viewed by the second microscope.

* * * * *

UNITED STATES PATENT AND TRADEMARK OFFICE
CERTIFICATE OF CORRECTION

PATENT NO. : 5,581,487  
DATED : December 3, 1996  
INVENTOR(S) : Kelly, et al.

Page 1 of 2

It is certified that error appears in the above-identified patent and that said Letters Patent is hereby corrected as shown below:

In column 5, line 55, after "FIG. 1 is" insert --a--. In column 10, line 54, after "by", insert --the--. In column 13, line 42, replace the single hyphen between "invention" and "based" with a double hyphen. In column 13, lines 54-56, replace $$D' = \begin{bmatrix} f_3^1 - f_2^1 & f_1^1 - f_2^1 \\ f_3^2 - f_2^2 & f_1^2 - f_2^2 \end{bmatrix}$$

with $$D' = \begin{bmatrix} f'^1_3 - f'^1_2 & f'^1_1 - f'^1_2 \\ f'^2_3 - f'^2_2 & f'^2_1 - f'^2_2 \end{bmatrix}$$

In column 13, line 58, replace "$f_1^1$, $f_1^2$" with --$f'^1_1$, $f'^2_1$--.  
In column 13, line 59, replace "$f_2^1$, $f_2^2$" with --$f'^1_2$, $f'^2_2$--.  
In column 13, line 60, replace "$f_3^1$, $f_3^2$" with --$f'^1_3$, $f'^2_3$--. In column 14, line 30, replace "$f_2$" with --$f'_2$--. In column 16, line 29, after (Block 4024) insert a period (.).

UNITED STATES PATENT AND TRADEMARK OFFICE
CERTIFICATE OF CORRECTION

PATENT NO. : 5,581,487

DATED : December 3, 1996

INVENTOR(S) : Kelly, et al.

It is certified that error appears in the above-identified patent and that said Letters Patent is hereby corrected as shown below:

IN THE CLAIMS: In Claim 6, column 19, line 5, after "location ", insert --of--. In Claim 11, column 21, line 1, after "(c)", insert a (comma). In Claim 11, column 21, lines 19-20, replace "

$$D' = \begin{bmatrix} f_3^1 - f_2^1 & f_1^1 - f_2^1 \\ f_3^2 - f_2^2 & f1^2 - f_2^2 \end{bmatrix}$$

with

-- $$D' = \begin{bmatrix} f'^1_3 - f'^1_2 & f'^1_1 - f'^1_2 \\ f'^2_3 - f'^2_2 & f'^2_1 - f'^2_2 \end{bmatrix}$$ --

In Claim 11, column 21, line 25, after "(0)", insert a (comma).
In Claim 16, column 23, line 32, replace "(h)" with --(a)--.

Signed and Sealed this

Sixteenth Day of September, 1997

Attest:

*Attesting Officer*

BRUCE LEHMAN

*Commissioner of Patents and Trademarks*